United States Patent [19]

D'Agaro et al.

[11] Patent Number: 5,779,037
[45] Date of Patent: Jul. 14, 1998

[54] CONTAINER FOR STORING A NUMBER OF COMPACT DISKS

[75] Inventors: Amos D'Agaro; Andrea Venturini, both of Udine, Italy

[73] Assignee: Exponent Italia S.r.l., Udine, Italy

[21] Appl. No.: 745,287

[22] Filed: Nov. 8, 1996

[30] Foreign Application Priority Data

Nov. 24, 1995 [IT] Italy .................. PN950043 U

[51] Int. Cl.⁶ .................................................. B65D 85/57
[52] U.S. Cl. .................. 206/308.1; 206/309; 312/9.58
[58] Field of Search .................. 206/308.1, 307, 206/307.1, 309, 312, 313, 508, 509, 445; 312/9.42, 9.58, 9.61, 9.64

[56] References Cited

U.S. PATENT DOCUMENTS

| | | | |
|---|---|---|---|
| 4,875,743 | 10/1989 | Gerladi et al. | 206/309 |
| 4,998,618 | 3/1991 | Borgions | 206/308.1 |
| 5,099,995 | 3/1992 | Karakane et al. | 206/308.1 |
| 5,244,084 | 9/1993 | Chan | 206/309 |
| 5,366,073 | 11/1994 | Turrentine et al. | 206/509 |
| 5,425,451 | 6/1995 | Blase | 206/309 |
| 5,547,078 | 8/1996 | Iida | 206/308.1 |
| 5,617,950 | 4/1997 | Chung | 206/308.1 |

FOREIGN PATENT DOCUMENTS

| | | | |
|---|---|---|---|
| 104580 | 3/1917 | United Kingdom | 206/309 |

*Primary Examiner*—Ted Kavanaugh
*Assistant Examiner*—Luan K. Bui
*Attorney, Agent, or Firm*—Wenderoth, Lind & Ponack

[57] ABSTRACT

A container for storing a number of compact disks includes a housing having an aperture accessing the interior of the housing and a housing insert 2. The housing insert 2 is made up of a handle and a number of CD support components pivoted to the handle. The handle is pivoted flush against the side of the support components 20, and then the housing insert 2 is inserted into the aperture of the housing 1 so as to be received therein. The separate support components 20 can be pivoted about the pivot shaft of the handle 21 in the inserted position so as to allow the user access to particular CDs. Elastic holding members are provided on the housing for retaining the CD support members in the housing. The support component members are pivotal through an arc of at least 90° so as to allow the user to properly remove any particular CD.

12 Claims, 3 Drawing Sheets

5,779,037

1

CONTAINER FOR STORING A NUMBER OF COMPACT DISKS

BACKGROUND OF THE INVENTION

1) Field of the Invention

The present invention relates to a container for storing a number of compact disks.

2) State of the Prior Art

In order to store compact disks and CD ROMs (both referred to as "CDs" in the present application), currently in use are containers that have an essentially rectangular housing. Such containers necessarily require housing boxes that are made of a plastic material that contain the CDs. Each has its own support element. The boxes with the respective CDs are stacked and held in the container by spring retaining components that permit separate extraction of each box by sliding the box on guide grooves that are recessed in vertical walls of the housing.

The overall cost of such containers is relatively high, and is not truly justified in view of the function that is performed. Also, the use of space is inefficient. The spring retainer component, moreover, which in practice are spring couplers, are thick and are not carefully made. They can be subject to sticking, and thus they do not last long.

SUMMARY OF THE INVENTION

Accordingly, the object of the present invention is to provide a container without the disadvantages of containers in the prior art. Furthermore, the object of the invention is to provide a container in which a user can easily insert, identify and remove CDs.

Thus according to the present invention, there is provided a CD container that has a housing defining an interior space with a peripheral aperture opening into the interior space. A plurality of CD support members are pivotally mounted on the housing so as to be separately pivotal through an arc of at least 90° through the aperture between a first position inside the housing and a second position outside the housing. Elastic holding members on the housing retain the plurality of CD support members in the housing.

Preferably the plurality of CD support members form a housing insert, with the CD support members being pivotally mounted on a handle. A housing and housing insert connection comprise a first engagement member in the housing and a complementary second engagement member on the handle. The elastic holding members are spaced members on the housing that are located on one side of the aperture and hold the plurality of CD support members so as to retain them in the housing when the housing insert is inserted into the aperture.

The CD support members have peripheral projections that project toward the outside of the housing at the aperture when the plurality of CD support members are in the first position. The projections of adjacent CD support members are angularly staggered from each other with respect to the peripheral aperture to enable a user to selectively pivot one of the CD support members to the second position outside of the housing. Indicia on the housing correspond in number and position to the plurality of CD support members so that the respective CDs can be identified by a user.

The housing preferably comprises top and bottom walls and sidewalls interconnecting the top and bottom walls, with the aperture being defined between the top and bottom walls. Furthermore, a plurality of recesses are preferably provided

2 in the top wall, with a plurality of corresponding projections projecting from the bottom wall. The recesses correspond in number to and are aligned in a direction perpendicular to the top and bottom walls with the projections. At least some of the projections, preferably, are provided with non-slip support feet.

The plurality of CD support members are pivoted on a shaft that is mounted on the handle. The handle has spacer members thereon that space the plurality of CD support members from each other, and the housing has a recess that removably receives an end of the pivot shaft. The recess at the end of the pivot shaft can form the housing and housing insert connection. Alternatively, a pair of projections on the handle and a pair of recesses on the housing can form the housing and housing insert connection.

The elastic holding members, discussed above as spaced members, are preferably in a comb structure so as to engage respective holding projections on the side surfaces of the CD support members and frictionally hold the CD support members in the housing.

BRIEF DESCRIPTION OF THE DRAWINGS

Further objects, features and advantages of the present invention will become clear from the following description, taken in consideration of the accompanying drawings, in which.

DETAILED DESCRIPTION OF THE PREFERRED EMBODIMENTS

Figure 1:
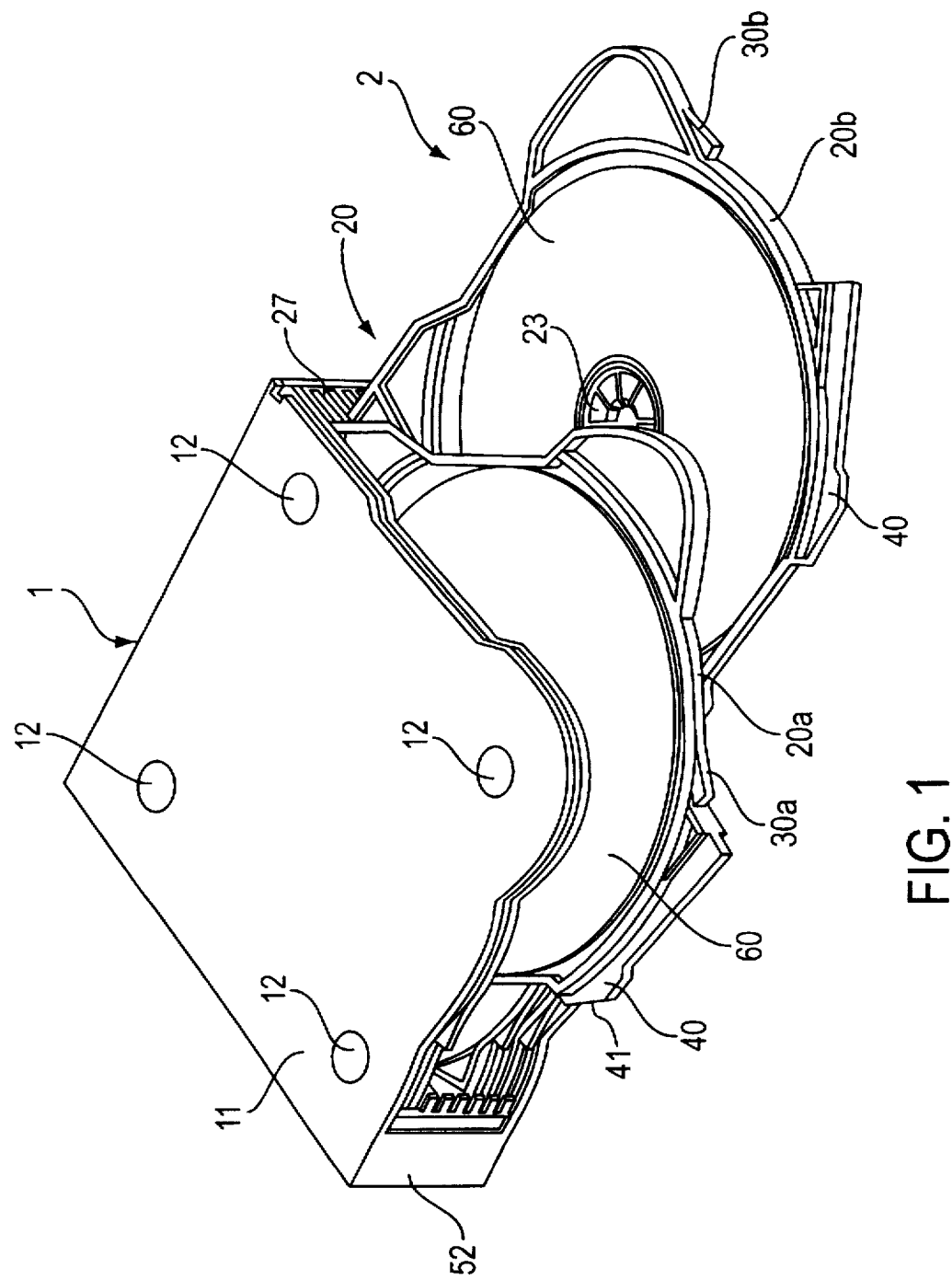
FIG. 1 is a perspective view of a CD container according to the present invention.

A container according to the present invention includes a housing 1 in the form of an essentially rectangular box and a housing insert 2 comprising a plurality of support components 20. The housing 1 has an upper wall or top wall 11 as shown in FIG. 1 that includes a plurality of recesses 12. Corresponding projections are formed on a respective bottom wall at the same positions on the bottom wall as the recesses 12 on the top wall. That is, the recesses and projections on the respective top and bottom walls are aligned in a direction perpendicular to their surfaces. This enables a number of housings 1 to be stacked one on top of each other so as to form a single unit by the projections of one housing 1 engaging the recesses of another housing 1. Non-slip feet may be provided on one, several or all of the projections on the bottom wall of the housing 1. The projections on the bottom wall and the non-slip feet are not shown specifically for ease of illustration, as the projections simply correspond to the recesses 12 as discussed, and because non-slip feet are well known features that do not need to be illustrated by themselves.

Figure 2:
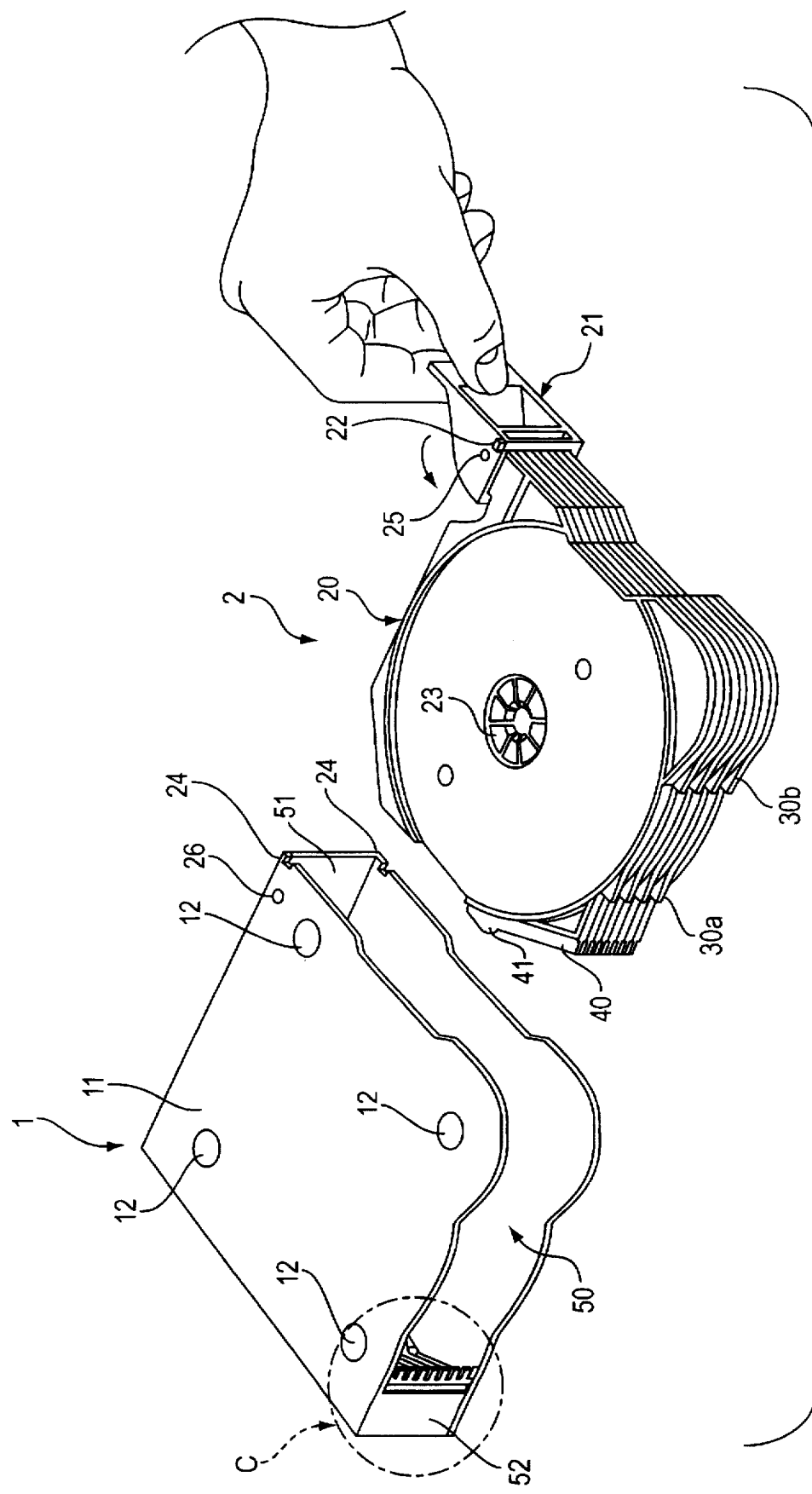
FIG. 2 is a perspective view of a housing and a housing insert of FIG. 1 in separate form.

Referring now to FIG. 2, the housing insert 2 includes the support components 20. Each support component 20 is in the form of a disk carrier plate or tray, and includes a central coupler washer 23 as known in the art for receiving a respective CD 60. The support components 20 are essentially square in shape, although of course there are variations in the shape as for example demonstrated in FIG. 2. The coupler washer 23 receives the CD 60 as demonstrated in FIG. 1.

Each of the support components 20 are pivoted at one corner on a common vertical swivel shaft or leg 25. In FIG.

2, only the top of this shaft 25 can be seen, and it is shown as projecting slightly out of the top of a handle 21, by which it is supported. Thus the housing insert 2 has the support components 20 pivoted with respect to the handle 21, effectively. As shown in FIG. 2, the handle 21 can be pivoted in the direction of the arrow shown in the figure so as to lie flat against the far right hand edge of the insert 2. By pivoting the handle 21 in this fashion, the housing insert 2 can then be inserted into the housing 1.

As can be seen from FIG. 1, the handle 21 includes a portion having the structure of a comb plate or simply a comb that spaces the respective support components 20 from each other. This is labeled 27 in FIG. 1, and is not labeled in FIG. 2, because it cannot be clearly seen in the pivoted position of the handle 21 shown in FIG. 2. However, upon pivoting of the handle, the comb structure 27 would appear between the respective support components 20 along the edge thereof as demonstrated for example in FIG. 1.

The housing 1 includes a peripheral aperture 50 that extends halfway around the periphery. The aperture 50 is of course for receiving the housing insert 2 into the interior of the housing 1 and allowing the support components 20 to be separately pivoted out of the housing. At one end 51 of the aperture 50 are a pair of seats 24. Corresponding engaging members or detents 22 are formed along an edge of the handle 21 as shown by FIG. 2. As shown by FIG. 1, when the handle is pivoted to the position in which it lies flat against the distal side of the housing insert 2, the detents 22 are pivoted to a position in which, when the housing insert 2 is inserted into the aperture 50, they will engage with the seats 24. The seats 24 and the detents 22 form a releasable coupling or connection between the housing insert 2 and the housing 1.

The housing 1 also has a hole 26 in the top thereof for receiving the end of the shaft 25 therethrough, the shaft 25 being received so as to not protrude beyond the surface of the top wall 11. Note that the shaft 25 can have its opposite ends protrude slightly beyond the surfaces of the handle 21 so as to be engaged in holes 26 that would be provided in the top wall 11 and the bottom wall of the housing 1.

With the housing insert 2 inserted into the aperture 50, the detents 22 engaged with the seats 24 and the shaft 25 engaged with the hole 26, the housing insert 2 is properly engaged with the housing 1. In this position, the support components 20 can be pivoted about the shaft 25 in the manner illustrated in FIG. 1. Preferably the support components 20 are pivotable through an arc of at least 90° about the shaft 25. However, at a minimum, the support components 20 are pivoted so as to move the compact disk 60 on the particular support component 20 to a position from which it can be removed by a user.

Along the edges of the support components are provided projecting portions 30 to assist the user in removing a particular support component for removal of a particular CD from the housing 1. Two adjacent support components 20a and 20b, for example, are provided with projecting portions 30a and 30b that are offset or staggered with respect to each other. As shown in FIG. 2, each adjacent support component 20 has its respective projecting portion 30 offset with respect to the adjacent support components so that each separate support component 20 can be easily separated and removed from the remaining support components 20. Thus a user's finger can easily move each separate support component so as to have it rotate about the shaft 25 to remove and replace CDs 60 without interference.

Because the detents 22 of the handle 21 and the end of the shaft 25 remain engaged with respective seats 24 and the hole 26 during the removal and replacement operation, the housing insert 2 remains connected to the housing 1. There is thus no risk of the support components 20 accidentally coming out of the housing 1 during handling.

It is noted that the handle 21 is preferably a one piece assembly with the projections 22. The spacers 27, which are substantially comb-like, have the same curved profile as the handle 21 as shown in FIG. 2. The spacers 27 and the handle 21 are preferably a one-piece assembly, along with the projections for detents 22, made by injection molding of a plastic material.

At another end 52 of the aperture 50, the housing 1 comprises an elastic comb plate 70 that is formed so as to be able to engage with engaging projections 40 that are provided along the edge of the support components 20. The projections 40 are located at a position that is diagonally opposite to the shaft 25, and thus also opposite to the handle 21.

Figure 3:
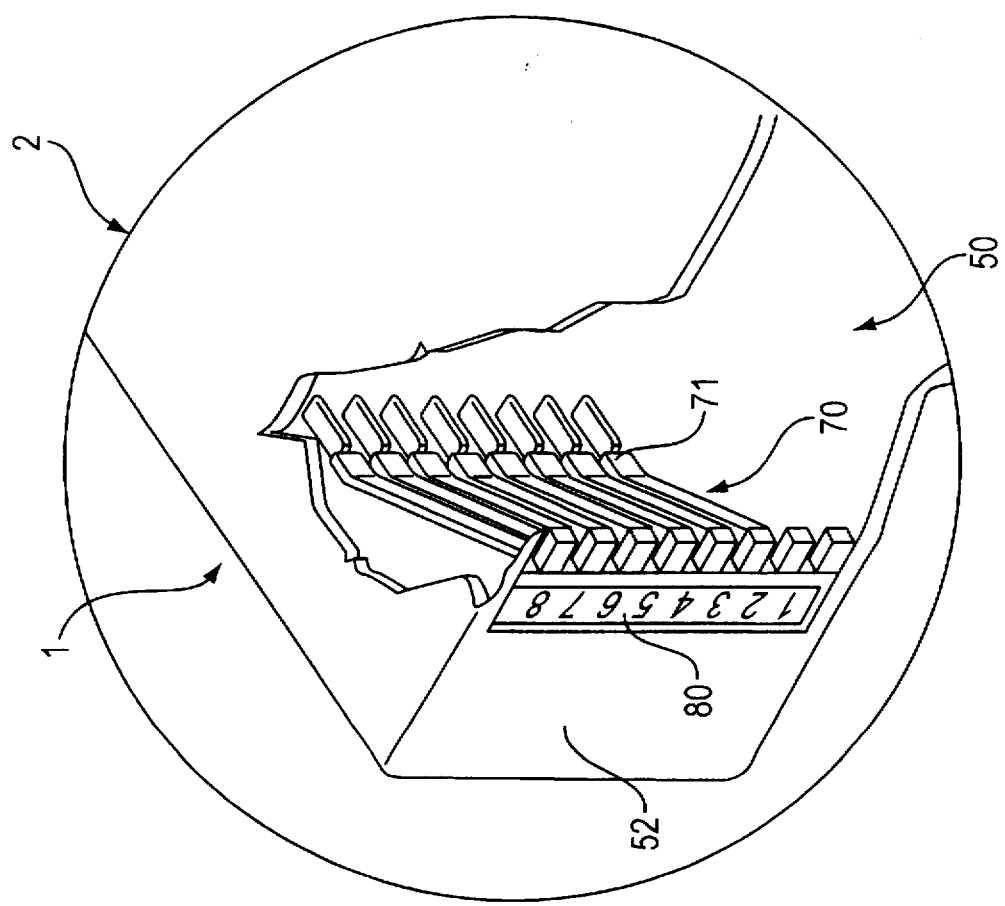
FIG. 3 is an enlarged view of the circled portion 3 of FIG. 2.

As can be seen from the detail in FIG. 3, the elastic comb plate 70 comprises a plurality of cantilever arms 71 for elastically and frictionally engaging the engagement projection 40 when the housing insert 2 is inserted into the aperture and when the support components 20 are in a first position pivoted completely inside of the housing 1. End portions 41 of the projections 40 engage at ends of the cantilever arms 71.

By using the point of a screwdriver, the housing insert 2 can be removed in its entirety from the housing 1, with all of the support components 20 and the CDs contained therein. The end of the leg 25 is pushed through the hole 26 in the top wall 11 (and optionally the bottom wall) so as to slightly distend the wall and allow for removal of the insert 2.

In order to allow for the identification of individual CDs contained in the support components 20, appropriately spaced markings 80, such as numbers, are provided in correspondence with the spaces between the cantilever arms 71 of the comb plate 70. Of course, separate labels could be applied to the outside of the housing itself.

While the invention has been described in the context of a square housing 1, it should be noted that similar advantages as are provided with the present invention could result from the use of a cylindrical housing with a semicircular aperture, and CD support components of different shapes. As can be seen from the above, the present invention results in the elimination of the typical containers or boxes that store individual CDs, and allows the storage of a number of CDs in a compact and efficient manner.

While the present invention has been described with reference to a specific embodiment as set forth above, this particular embodiment should not be taken as limiting, but merely as an example of the present invention that is defined in the following claims.

We claim:

1. A CD container, comprising:
    a housing defining an interior space and having a peripheral aperture opening into said interior space;
    a plurality of CD support members pivotally mounted on said housing so as to be separately pivotal through an arc of 90 degrees through said aperture between a first position inside said housing and a second position outside of said housing; and
    elastic holding members on said housing for retaining said plurality of CD support members in said housing;
    wherein each of said CD support members comprises a disk carrier plate having a central coupler washer; and wherein said plurality of disk carrier plates are pivoted on a pivot shaft that is mounted on a handle, said handle comprises spacer members thereon spacing said plurality of CD support members from each other, and said housing comprises a hole therein removably receiving an end of said pivot shaft therein.

2. A CD container, comprising:

a housing defining an interior space and having a peripheral aperture opening into said interior space;

a plurality of CD support members pivotally mounted on said housing so as to be separately pivotal through an arc of at least 90 degrees through said aperture between a first position inside said housing and a second position outside of said housing; and elastic holding members on said housing for retaining said plurality of CD support members in said housing;

wherein said elastic holding members comprise a plurality of spaced cantilever members, said plurality of CD support members comprises respective holding portions on side surfaces thereof and said holding portions can engage said spaced cantilever members;

wherein said housing has four sides extending about the periphery thereof, said aperture extending along two of said sides from one corner of said housing to a diametrically opposite corner of said housing;

wherein said CD support members are pivotally mounted on said housing at the one corner of said housing; and wherein said elastic holding members are located on said housing at the diametrically opposite corner thereof.

3. The CD container of claim 2, wherein said holding portions are projections.

4. The CD container of claim 3, wherein said elastic holding members extend from a position adjacent to said aperture to the inside of said housing.

5. The CD container of claim 3, wherein said elastic holding members together form a comb plate.

6. The CD container of claim 2, wherein when said CD support members are pivoted to a storage position inside said housing, said holding portions are located inside said housing and engage said cantilever members.

7. The CD container of claim 2, wherein:

said housing comprises a top surface, a bottom surface, side walls extending therebetween, and said aperture extending therebetween;

one of said side walls is positioned adjacent to said aperture and has an end portion defining one side of said aperture; and said cantilever members extend from a position adjacent to the end portion of the one of said side walls into said housing.

8. The CD container of claim 7, wherein said end portion comprises a comb plate that separates said CD support members from each other when pivoted into said housing.

9. The CD container of claim 7, wherein the one of said side walls comprises indicia thereon corresponding in number and position to said plurality of CD support members.

10. The CD container of claim 2, wherein said cantilever members have ends, and said holding portions of said CD support members have end portions that engage at said ends of said cantilever members when said CD support members are pivoted into said housing.

11. A CD container, comprising:

a housing defining an interior space and having a peripheral aperture opening into said interior space;

a housing insert comprising a plurality of CD support members pivotally mounted on a handle;

a housing and housing insert connection comprising a first engagement member on said housing and a complementary second engagement member on said handle; and spaced members on said housing located at one side of said aperture for retaining said plurality of CD support members in said housing when said housing insert is inserted into said aperture and said first engagement member is engaged with said second engagement member;

wherein said plurality of CD support members are pivoted on a pivot shaft that is mounted on said handle, said handle comprising spacer members thereon spacing said plurality of CD support members from each other.

12. The CD container of claim 11, wherein said second engagement member comprises an end of said pivot shaft and said first engagement member comprises a corresponding hole in said housing.

* * * * *